Aug. 24, 1937.  D. J. PHELPS ET AL  2,091,011
SOUND REPRODUCER
Filed Aug. 26, 1935   2 Sheets-Sheet 1
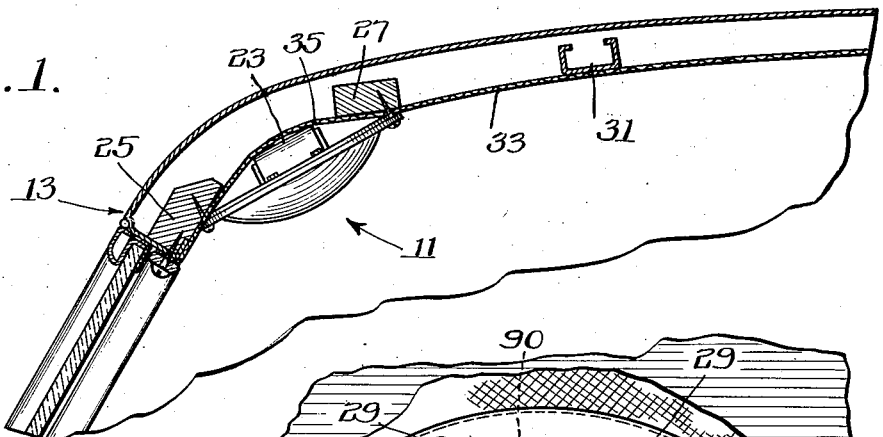
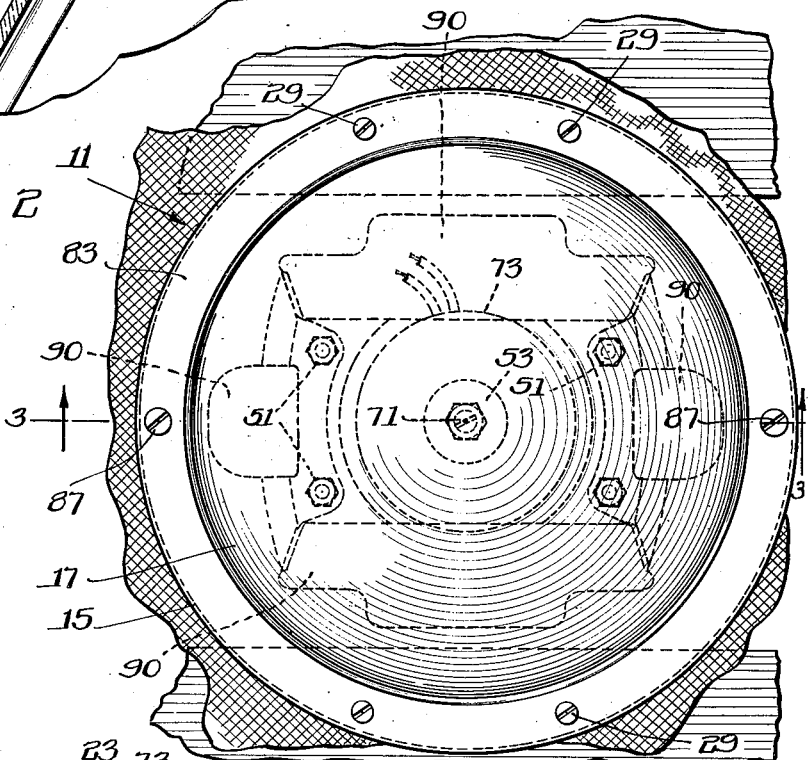
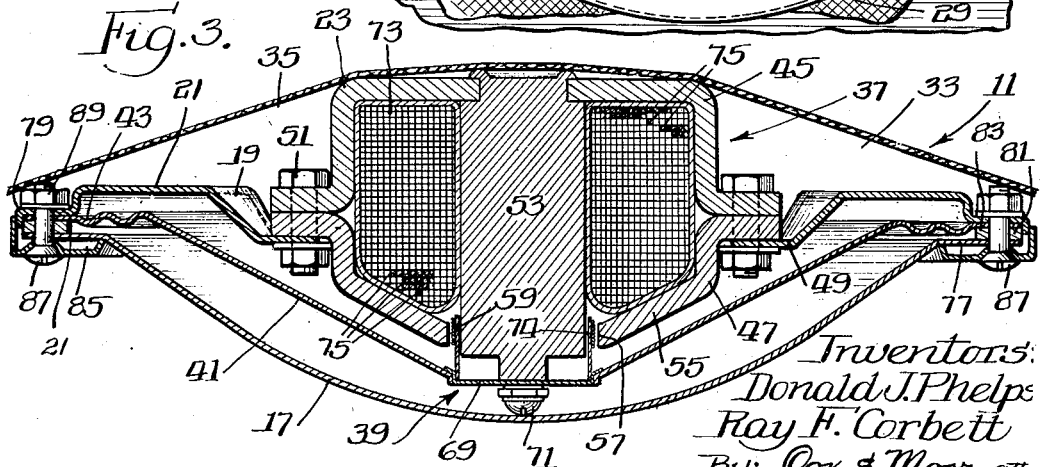
Inventors:
Donald J. Phelps
Ray F. Corbett
By: Cox & Moore atty Aug. 24, 1937.  D. J. PHELPS ET AL  2,091,011
SOUND REPRODUCER
Filed Aug. 26, 1935  2 Sheets-Sheet 2

Inventors
Donald J. Phelps,
Ray F. Corbett
By: Cox & Moore
attys.

Patented Aug. 24, 1937

2,091,011

UNITED STATES PATENT OFFICE 2,091,011

SOUND REPRODUCER

Donald J. Phelps, Berwyn, and Ray F. Corbett, Chicago, Ill., assignors, by mesne assignments, to Reconstruction Finance Corporation, Chicago, Ill., a corporation Application August 26, 1935, Serial No. 37,856

6 Claims. (Cl. 179—115.5)

Our invention relates in general to acoustics and has more particular reference to an improved loud speaker and means for mounting the same.

An important object of the invention resides in providing a sound reproducer adapted for use in connection with radio receivers, the invention having more particular reference to the provision of a loud speaker of shallow configuration, and hence particularly well adapted for mounting where space considerations are important.

Another important object resides in providing a sound reproducer suitable for mounting in a vehicle more particularly on the roof where the device will not interfere with the occupation of the vehicle by passengers.

Another important object is to provide a loud speaker particularly adapted for roof mounting in a vehicle and adapted to conform with the roof structure in order to impart a pleasing appearance when mounted, the device having minimum space requirements and having its structural arrangement such that portions may be arranged between elements of the roof structure so that the device encroaches to a minimum extent upon the available passenger space within the vehicle.

Another important object resides in the novel roof mounting of a sound reproducer unit of the character mentioned.

Another important object resides in forming the core element of a loud speaker in order to minimize the over-all depth of the same.

Another important object resides in providing for anchoring a unit of the character mentioned at its peripheral edges.

Another important object resides in providing a resilient, peripherally anchored support frame for the core and coil assembly of a sound reproducer; a further important object being to mount the diaphragm peripherally on said frame.

Another object resides in providing a reflector plate for a unit of the character mentioned and supporting the elements of the unit on said reflector plate, which, in turn, is utilized in securing the unit in mounted position.

A further object resides in elongating the effective length of the air column in a speaker of the character mentioned without, however, increasing the overall dimension of the unit whereby to improve the low frequency response of the reproducer; a further object being to elongate said air column by means of baffles preferably carried at least in part on the reflector plate.

Another important object resides in applying a flock finish, that is to say, finely divided felt, upon the metal parts forming the air channel in a speaker of the character mentioned in order to absorb high frequency vibrations.

Numerous other objects, advantages, and inherent functions of the invention will be apparent from the following description, which, taken in connection with the accompanying drawings, discloses preferred embodiments of the invention.

Referring to the drawings:

Figure 1 is a sectional view taken through the roof of a vehicle illustrating the manner of mounting a sound reproducer in accordance with the teachings of our present invention;

Figure 2 is an enlarged plan view of the speaker shown in Figure 1;

Figure 3 is a sectional view taken substantially along the line 3—3 in Figure 2;

Figure 4:
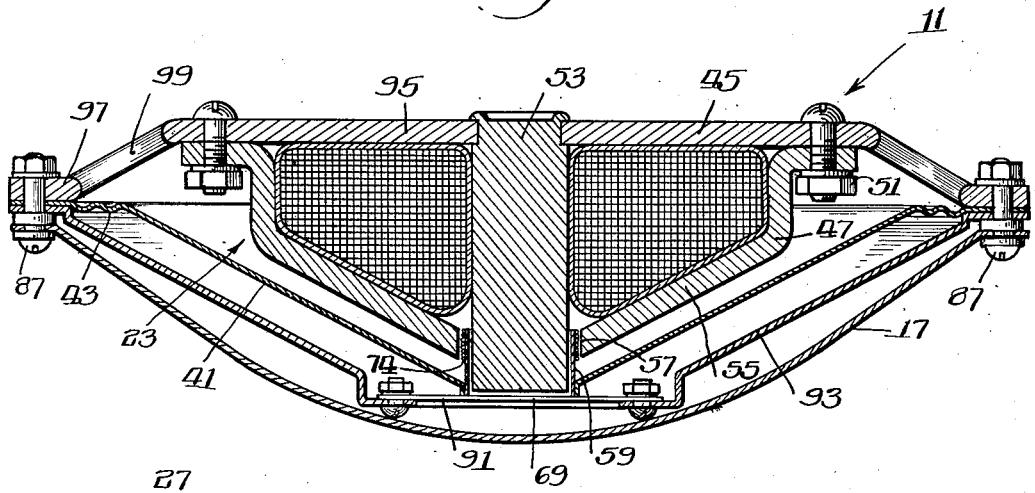
Figure 4 is a similar sectional view illustrating a modified construction.

To illustrate our invention, we have shown on the drawings an acoustical device 11 of shallow depth for use particularly as a sound reproducer in connection with a radio receiver and the invention includes features and structural arrangements whereby the device 11 is particularly adapted for mounting in a vehicle such as an automobile 13. The invention also includes the method of mounting an acoustical device of the character mentioned in a vehicle and particularly an automobile whereby the device may be mounted with a minimum of effort and when mounted occupies a minimum amount of space and does not interfere with the occupancy of the vehicle by passengers.

To this end, the speaker 11 has a preferably circular peripheral edge 15, a somewhat spherically shaped front cover 17 and a back comprising a support 19 having a substantially flat annular portion 21, which support carries a frame 23, the parts of which project rearwardly and centrally of said support so that the assembly may be mounted on the roof of an automobile between adjacent cross-roof members 25 and 27 of the automobile body, the marginal edges being secured to the spaced members 25 and 27 in any suitable fashion and preferably by means of holding screws 29 passing through the marginal edges of the unit and taking into the members 25 and 27. The unit also is preferably mounted between the roof member 25, forming the upper frame of the front window of the automobile and the next adjacent cross-member 27, although it will be apparent that the unit may be mounted between any suitable spaced roof members, as, for instance, the members 27 and 31. If, however, the unit is mounted between the members 25 and 27, it will be in a position tilted toward all of the passengers in the vehicle and, at the same time, will not interfere with the free movement of the passengers in the vehicle. It will be noted also that a part of the unit, namely the rearwardly facing portions of the frame 23, will extend between the members 25 and 27, on which the unit is mounted, so that the unit, at least in part, occupies otherwise unused space within the normal vehicle roof zone to the end that the effective space requirement of the unit is reduced to a minimum. Ordinarily, the roof members 25, 27, and 31 carry a finishing fabric 33 stretched across and secured to the same and the unit 11 is preferably mounted without disturbing this fabric, which is simply pushed upwardly, as at 35, around the back of the frame portion 23 when the unit is mounted, as clearly shown in Figure 1.

The unit 11 comprises a core element 37, an armature 39 supported in operative relationship with respect to the core element, and a diaphragm 41, on which the armature is supported, said diaphragm being of generally conical configuration with the armature secured thereto at the apex, the marginal edges of the diaphragm being formed with reversely curved portions 43 at the base of the cone with an annular marginal portion beyond the reversely curved portion by means of which the diaphragm is or may be clampingly secured to the marginal edge of the frame 19.

The core 37 comprises the frame 23, which may be formed in any suitable fashion. As shown in Figure 3 of the drawings, the core is formed in two parts 45 and 47, which are secured together and to a flanged portion 49 of the frame 19, as by means of bolts 51. The frame part 45 comprises a cup-shaped element extending rearwardly of the flat portion of the frame and carrying a pole 53, which is fastened in any suitable manner as by riveting at one end centrally of the bottom of the cup-shaped frame portion 45, said pole extending forwardly of said bottom and centrally within the substantially cylindrical casing formed by the frame 23. The frame portion 47 comprises an annular element having conical portions 55 extending forwardly of the flange 49, said conical portions being centrally perforated as at 57 to receive the pole 53 and an annular portion 59 of the armature 39, which extends around and embraces the end of the pole within the perforation 57, said annular portion 59 being freely shiftable within said perforation in an axial direction with respect to the pole.

The armature 39 comprises a flexible disk 69, which is secured to the end of the pole 53 by means of a suitable fastening screw 71, and the annular portions 59 are secured at the edges of said disk 69 as is also the central portion of the diaphragm 41. The annular portions 59 of the armature also carry windings forming an actuating coil 74 in position within the annular air gap between the pole 53 and the edges of the perforation 57.

The frame 23 carries an annular magnetizing or field coil 73, comprising electrical conductors arranged in coils 75 around the pole 53. The magnetizing coil 73 entirely fills the space within the frame 37 around the pole 53 and it will be seen that the conical arrangement of the frame part 47, whereby the wall 55 extends parallel with and slightly spaced from the overlying portions of the diaphragm 41, permits a relatively large number of conductor coils 75 to be housed in otherwise unutilized space behind the diaphragm in order thus to reduce the overall depth of the assembly.

In order to provide an attractive finish and, at the same time, to guard the diaphragm and armature against accidental damage, we provide the preferably grille-like cover 17 having a central cover portion of somewhat spherical configuration and adapted to overlie the diaphragm 41, said covering including an annular marginal flange 77 adapted to be clampingly secured to the marginal edge of the frame 19. To this end, the frame 19 has a peripheral edge 79 offset forwardly of the portion 21 and formed as a seat to receive the marginal portion 81 of the diaphragm, which is secured in said seat by means of an annular ring 83, upon which rests the edge 77 of the cover 17. The parts are secured together preferably by means of an annular holding ring 85 overlying the edge 77 of the cover 17 and fasteners 87, comprising headed screws, penetrating aligned perforations in the rings 83 and 85 and in the flanged portions 77, 79, and 81, and secured in position by holding the nuts 89.

These fastening elements 87 are preferably two in number and are arranged on diametrically opposite sides of the speaker. The parts, however, are additionally secured together by means of the fastening screws 29 after the unit is mounted, since these elements 29 penetrate suitable perforations in the rings 83 and 85 and in the portions 77, 79, and 81.

It will be noted that the frame 19 does not entirely close the space behind the diaphragm 41. On the contrary, relatively large openings 90 are provided in order to permit free movement of air behind the diaphragm.

In Figure 4 of the drawings, we have shown a modified construction whereby the overall depth of the device may be substantially reduced by increasing the diameter of the housing provided by the core 23 while, at the same time, increasing the length of the conical portion 55. In the embodiment shown in Figure 4, the frame 19 of the construction shown in Figure 3 is eliminated, the core frame portion 45 being formed as a disk 95, the marginal edges of which project outwardly of the frame portion as at 97 to take the place of the frame portion 19. The projecting portions of the disk 95 may be formed with spaced openings 99 to permit free movement of air to the back of the diaphragm 41.

The armature 69 also is not secured to the end of the pole 53, as shown in Figure 3, but the annular armature portion 59 is, together with the central portions of the diaphragm 41, secured in a relatively large flexible disk 91, corresponding to the disk 69 shown in Figure 3. The disk 91 is secured at its marginal edges on a frame element 93, having marginal edges secured to the marginal edges of the enlarged disk forming the back of the core frame 23, with the edges of the diaphragm 41 clampingly secured therebetween.

Figure 5:
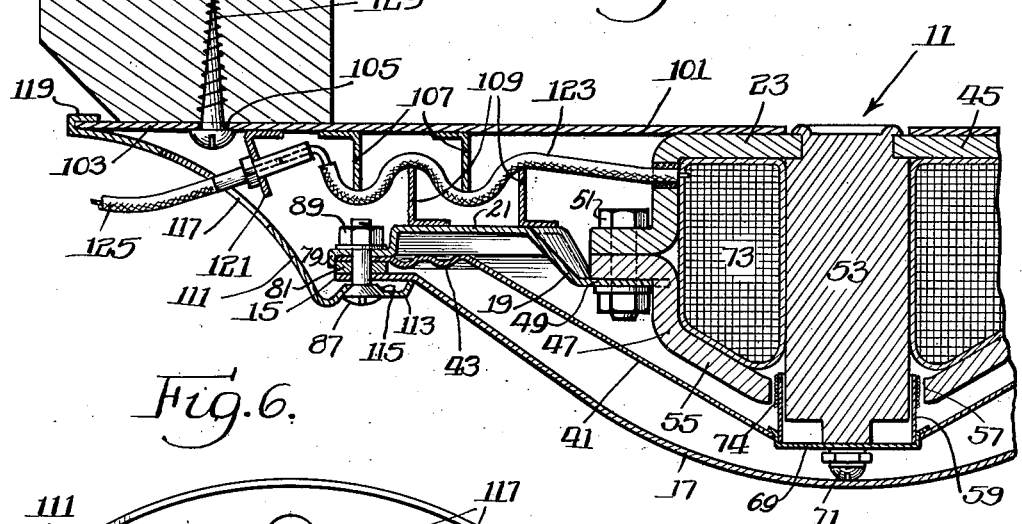
Figure 5 is a sectional view taken through a roof of a vehicle to illustrate a modified speaker construction and manner of mounting the same.

In Figure 5, we have shown additional features, whereby the operating characteristics of the unit are improved without however materially increasing the overall depth of the device.

As shown, the unit 11 is provided with a backing comprising an enlarged preferably sheet metal reflector plate 101 extending centrally behind the frame 23 and having marginal edges 103 of preferably circular configuration and extending beyond the marginal edges 15 of the unit 11. This reflector plate is preferably secured to the frame 23 and is provided with perforations 105 near its marginal edges by means of which the plate and the speaker assembly 11 may be secured to the frame elements 25 and 27, or 27 and 31 of the car body, in which the device is mounted. The plate 101 carries annular baffle rings 107 opposite the marginal portions of the speaker assembly 11 and the frame 19 of the speaker assembly carries similar annular baffles 109 extending rearwardly thereof toward the backing plate and concentrically arranged with respect to the baffles 107 in order to provide a tortuous air passage communicating with the openings 99 and hence with the space behind the diaphragm 41 in order to lengthen the path of the air column in communication with the back of the diaphragm and thus improve the low frequency response of the unit.

Figure 6:
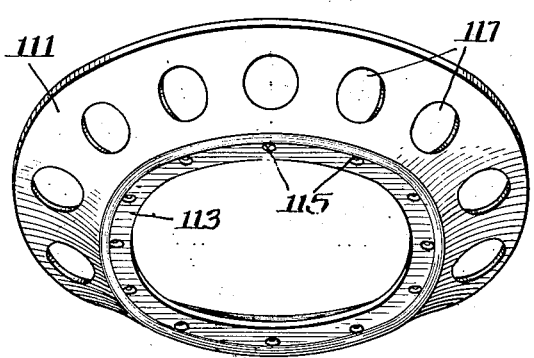
Figure 6 is a perspective of a shell-like element forming a part of the construction shown in Figure 5.

To additionally secure the unit 11 on the reflector plate 101, we provide a marignal cover, preferably as shown in Figure 6, comprising an annular preferably sheet metal element 111, the inner edges 113 of which are formed to take the place of the ring 85 shown in the construction illustrated in Figure 3, said inner edges being formed with perforations 115 to receive the clamping elements 87. Outwardly of said edge 113, the element 111 is flared rearwardly and formed with a plurality of enlarged openings 117 communicating with the tortuous passage provided by the baffles 107 and 109. The outer marginal edges of the element 111 are formed for detachable connection with the outer edges of the plate 101, as, for instance, by crimping portions of the edges together as shown at 119. It will be noted that the openings 117 are arranged in position to permit the fastening elements 129 to be applied through the openings 105 and secured in the frame members 27 by manipulation of the fastening elements 129 through said openings 117. The backing plate 101 may additionally carry a terminal plate 121, to which conductors 123 leading to the actuating coil 73 are connected. These conductors may pass through the tortuous channel provided by the baffles 107 and 109, and the terminal plate 121 affords means whereby conductors 125, leading to a radio receiving set located remotely in the vehicle, may extend through one or more of the openings 117 and be connected to the conductors 123 at the terminal plate 121 in a detachable manner.

If desired, the inner surface of the element 111, the plate 101, the baffles 109 and the surface of the frame 19, defining the tortuous air column, may be provided with so-called "flock finish" comprising finely divided felt and a suitable adhesive applied as by spraying upon the surfaces to be finished. This flock finish provides an absorbing effect, particularly upon high frequency sound vibrations and improves the response of a unit so treated.

The outer surfaces of the element 11, as well as the forwardly facing surface of the cover member 17 may, of course, be finished in any suitable or preferred manner in order to enhance the appearance of the unit.

It is thought that the invention and numerous of its attendant advantages will be understood from the foregoing description and it is obvious that numerous changes may be made in the form, construction, and arrangement of the several parts of the illustrated apparatus without departing from the spirit or scope of our invention or sacrificing any of its attendant advantages, the preferred modes and forms herein described being merely for the purpose of illustrating the invention.

Having thus described our invention, what we claim as new and desire to secure by Letters Patent is as follows:

1. A sound reproducer comprising a frame embodying a sheet metal stamping forming an annular rim and having a central opening, said stamping being formed to provide opposed seats at said opening, an electro-magnet on said seats and extending in said opening, said magnet having portions extending on opposite sides of said stamping, and comprising an annular magnetizing coil, a pair of straps secured together at their opposite ends to form a shell, said coil extending between said straps and one strap having an opening in alignment with the axis of the coil, a post secured at one end to one of said straps and extending through said coil and into said opening, a diaphragm having marginal edges secured to the annular rim of said frame and having central portions extending opposite the opening, an actuating coil and means mounting said actuating coil on said diaphragm in position encircling said post within said opening.

2. A sound reproducer comprising a frame embodying a sheet metal stamping forming an annular rim and having a central opening, said stamping being offset to form seats at said opening, an electro-magnet on said seats and extending in said opening, said magnet having portions extending on opposite sides of said stamping, a diaphragm secured at its margin to the annular rim of said frame and having a central portion extending opposite said electro-magnet, an actuating coil on the central portion of said diaphragm in co-operative relationship with said electro-magnet, a baffle plate behind and in spaced relationship with respect to said frame and staggered baffle rings on said frame and said baffle plate forming an elongated air path from said diaphragm through the frame opening and between said staggered baffle rings to the marginal edge of said frame.

3. A sound reproducer as set forth in claim 2, including means for securing the marginal edges of said frame on said baffle plate outwardly of said baffle rings.

4. A sound reproducer as set forth in claim 2, including an annular perforated finishing ring securing the marginal edges of said frame with said baffle plate outwardly of said baffle rings.

5. A sound reproducer as set forth in claim 2, including an annular perforated finishing ring securing the marginal edges of said frame with said baffle plate outwardly of said baffle rings, including fasteners securing together the marginal edges of said frame and diaphragm and for securing the same to the inner edge of said finishing ring.

6. A sound reproducer comprising a frame embodying a sheet metal stamping forming an annular rim and having a central opening, said stamping being formed to provide opposed seats at said opening, an electro-magnet on said seats and extending in said opening, said magnet having portions extending on opposite sides of said stamping, a diaphragm having marginal edges secured to the annular rim of said frame and having central portions extending opposite said electro-magnet in operative relationship therewith.

DONALD J. PHELPS.
RAY F. CORBETT.